Oct. 15, 1935.     E. F. GOODYEAR ET AL     2,017,715
HUB BRAKE
Filed Nov. 30, 1934     2 Sheets-Sheet 1

Oct. 15, 1935.  E. F. GOODYEAR ET AL  2,017,715
HUB BRAKE
Filed Nov. 30, 1934  2 Sheets-Sheet 2

INVENTORS
Ernest Frederick Goodyear
Joseph Wright
by Usina & Rauber
their Attorneys Patented Oct. 15, 1935

2,017,715

UNITED STATES PATENT OFFICE 2,017,715

HUB BRAKE

Ernest Frederick Goodyear, Moxhall Park, Wishaw, and Joseph Wright, Stoke Park, Coventry, England, assignors to Dunlop Rubber Company, Limited, London, England, a corporation of Great Britain Application November 30, 1934, Serial No. 755,334
In Great Britain December 22, 1933

6 Claims. (Cl. 188—18)

This invention concerns improvements in or relating to hubs and brakes and in particular concerns improvements in hubs and brake mechanism for aircraft wheels in which the tire is mounted directly upon the hub or in very close proximity thereto so that tires of large cross-section may be employed to utilize their large cushioning capacity for landing purposes.

It is well known, however, that the heat set up by brakes is injurious to the tire if transmitted thereto as would be the case where the brake mechanism is confined in a metallic enclosure of relatively small cubic capacity which passes through the center of the tire in a position in which it is difficult to ensure adequate cooling by air currents.

The object of the present invention is to provide a form of hub of a type sufficiently strong to withstand the maximum brake torque of the fluid operated brakes of the present day and in which the heat engendered by such brakes is dissipated to a much greater degree by isolation from the tire.

Furthermore the construction employed permits the use of a well base tire seating surface and an improved degree of accessibility for inspection purposes without causing the mechanism to protrude unduly beyond the streamline outline of the wheel when the tire is mounted thereon.

According to our invention a hub brake is provided with a plurality of stationary discs and discs rotatable with the wheel, said discs being movable axially into frictional contact by a distensible member, and being positioned within an extension formed upon one end of the hub.

In order that the invention may be more easily understood and readily carried into effect, the same will now be described with reference to the accompanying drawings in which:—

Figure 1:
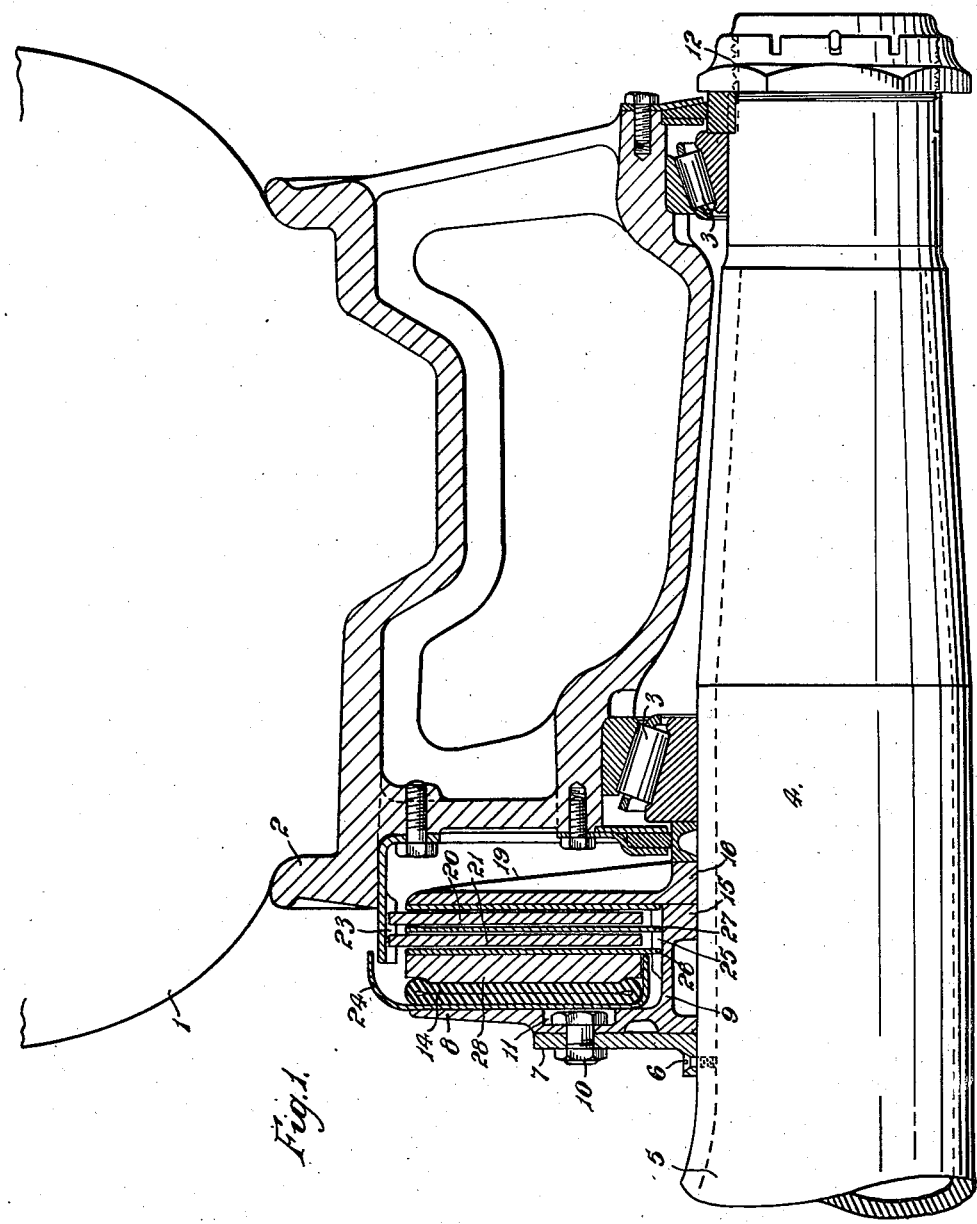
Figure 2:
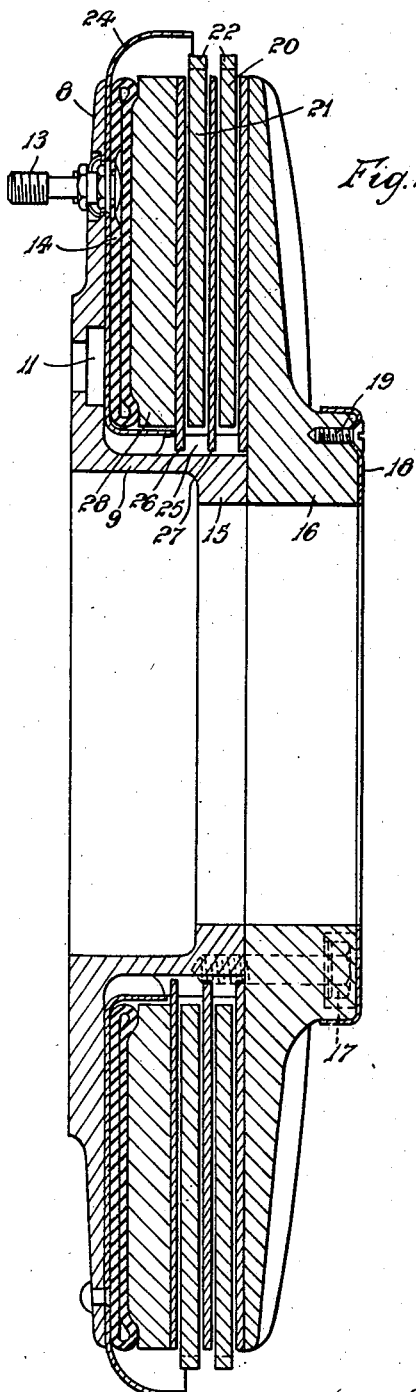

Fig. 1 is a part sectional elevation of the brake gear and hub; Fig. 2 is a sectional elevation of the brake unit detached from the hub.

The tire 1 is carried on a cast light weight metal hub 2, the central hollow bore of which is rotatable on roller bearings comprising conical rollers 3 supported in races at each end of a stud axle 4.

The stud axle 4 is non-rotatable and at one end 5 bends upwardly to be secured pivotally or otherwise in known manner to the body of the aircraft.

The stud axle 4 has a collar 7, non-rotatably welded or otherwise secured to it at 6 and the brake mechanism unit is detachably positioned between this collar 7 and the inner end of the hub or wheel adjacent the vehicle.

The brake unit consists of an inner abutment 8 at the inner end of the axle and is integrally cast of light weight metal with a base portion 9 secured to the non-rotatable collar 7 by a plurality of nuts and bolts 10, the heads of which may be non-rotatably located in recesses 11 in the abutment 8.

The abutment 8 is apertured and this aperture is provided with a pipe 13, Fig. 2, which is connected by tubing to a source of fluid pressure which passes through the pipe into a distensible member 14 which reacts against the abutment 8 without being called upon to resist any deformation by twisting.

A fairing 24 seated against the abutment 8 overhangs and protects the distensible member and adjacent brake parts from dust and mud.

The base 9 of the abutment extends outwards towards the hub and merges into a portion 15 of the greater diameter resting on the axle, the outer radial face spacing and locating the outer abutment 16 which is secured to the base 9 by a plurality of inset studs 17, Fig. 2, covered with a cover plate 18 held fast by smaller studs 19, Fig. 2.

The face of the outer abutments 16 is cast with integral reinforcing and cooling ribs 19 and is spaced from the adjacent wall of the hub 2 by its thickened base 16 to provide an additional air insulation gap to minimize transfer of heat from the brake to the hub and tire.

Between the non-rotating abutment 8, the distensible bag 14 bearing thereon and the outer abutment 16 are a plurality of annular friction elements some of which rotate with the hub and some of which are held stationary by interconnection with the stub axle and its collar 7.

In the construction shown there are two stationary friction elements and four stationary friction surfaces engaging with as many rotatable annular friction surfaces, but this number may be varied as desired.

The rotating friction elements 20 and 21 are composed of suitable friction material which may be non-metallic and their peripheries are formed with castellations 22, the radial portions of which interlock with complementary but axially elongated castellations 23 on a portion of the hub which is either integral therewith or attached thereto as shown and which extends inwardly towards the fairing 24 to enclose the mechanism.

The inner edges of these elements 20 and 21 which are thus carried round by the wheel approximate in diameter to the diameter across a plurality of circumferentially spaced axial splines 25 cast integral upon the outer cylindrical surface of the base 9 of the inner non-rotating abutment 8.

These splines 25 integral with the stationary inner abutment 8 prevent the friction elements 26 and 27 from rotating and in similar manner to the elongated castellations 23 permit only axial movement relative to the projections with which they are interengaged.

To minimize any liability to seizure consequent upon the use of one kind of friction material the non-rotating elements 26 and 27 consist of apertured steel discs and between the disc 26 and the air bag 14 is interposed a comparatively thick ring 28 composed of suitable heat resisting material to protect the air bag 14 and also to transmit the pressure uniformly to the adjacent friction elements 26, the weight of the ring being supported and its axial displacement guided by an axial flange formed on the central portion of the fairing 24.

The outer radial surface of the ring 28 is preferably circumferentially recessed around the edges adjacent the distensible annulus to minimize the flexure of the distensible annulus when it is collapsed to the position shown.

In operation air or liquid is forced into the distensible annulus 14, the expansion of which applies a uniform pressure through the heat resisting ring to the steel disc 26 which then bears against the friction disc 27, the axial pressure being transmitted successively to the remaining discs and pressing them together against the abutment 18.

On release of the fluid pressure the distensible member 14 collapses to the shape shown and the consequent separation of the friction elements releases the brake pressure.

The construction described is also particularly convenient as regards maintenance because the two abutments and the discs and air bag between them can be inspected by displacing the hub outwards along the axle and detaching the hubs 9 and 16, and can be removed as a unit separate from the hub after the latter has been lifted from the axle after the removal of the end nut 17.

Having now particularly described our invention we claim:—

1. A vehicle wheel assembly which comprises an axle, a vehicle wheel hub rotatable on said axle, an abutment fixed on said axle, a brake unit between said hub and said abutment, said brake unit comprising an abutment plate detachably secured to said abutment and having a collar encircling said axle and extending toward said hub, longitudinal splines on the surface of said collar, a reinforced plate on said axle at the free end of said collar and secured thereto and spaced from said hub, an extension from said hub over said reinforced plate and, on said collar between said plates and in succession from said abutment plate, an inflatable annular tube, a heat insulating plate, and a series of slidable friction discs, alternate discs being keyed to the splines on said collar and to said extension from said hub.

2. The apparatus of claim 1 in which the reinforcements on said reinforced plate extend radially.

3. The apparatus of claim 1 in which said insulating plate has a recessed edge to receive the folded edges of the inflated annular tube.

4. The apparatus of claim 1 in which said brake unit is mounted on said axle independently of said wheel.

5. A brake unit which comprises a pair of annular plates spaced from each other and a collar joining said plates at their inner edges, longitudinal splines on said collar, a series of annular friction discs encircling said collar adjacent one of said plates, an annular inflatable tube encircling said collar and adjacent the other plate, and a heat insulating plate between said inflatable tube and said friction discs, alternate discs of said friction discs being notched at their outer peripheries and at their inner peripheries, the latter slidably engaging splines on said collar.

6. A vehicle wheel assembly which comprises an axle, a brake unit mounted on said axle, said unit comprising a pair of annular plates spaced from each other and a collar joining said plates at their inner edges, longitudinal splines on said collar, a series of annular friction discs encircling said collar adjacent one of said plates, an annular inflatable tube encircling said collar and adjacent the other plate, a heat insulating plate between said inflatable tube and said friction discs, alternate discs of said friction discs being notched at their outer peripheries and at their inner peripheries, the latter slidably engaging splines on said collar, means for securing the plate adjacent said inflatable tube rigidly to said axle, and a vehicle hub longitudinally spaced from the opposite plate of said brake unit and having splines extending to engage the notches on the outer peripheries of said friction discs.

ERNEST FREDERICK GOODYEAR.
JOSEPH WRIGHT.